(12) United States Patent
Chapagain et al.

(10) Patent No.: US 11,518,288 B2
(45) Date of Patent: Dec. 6, 2022

(54) ROCKER SUPPORT INSERT

(71) Applicant: Caterpillar Inc., Peoria, IL (US)

(72) Inventors: Pradeep Chapagain, Dunlap (NP); Ryan P Morge, Clinton, IL (US)

(73) Assignee: Caterpillar Inc., Peoria, IL (US)

(*) Notice: Subject to any disclaimer, the term of this patent is extended or adjusted under 35 U.S.C. 154(b) by 349 days.

(21) Appl. No.: 16/663,551

(22) Filed: Oct. 25, 2019

(65) Prior Publication Data
US 2021/0122281 A1   Apr. 29, 2021

(51) Int. Cl.
*B60P 1/28* (2006.01)

(52) U.S. Cl.
CPC ................................. *B60P 1/283* (2013.01)

(58) Field of Classification Search
CPC .. B60P 1/283; B60P 1/286; B60P 1/28; B60P 1/16; B60P 3/222; F16F 2230/0058
USPC ............. 298/7, 17 R, 19 R, 22 R, 22 P, 17 B
See application file for complete search history.

(56) References Cited

U.S. PATENT DOCUMENTS

| | | | |
|---|---|---|---|
| 3,552,798 A * | 1/1971 | Cole et al. | B60P 1/16 298/22 R |
| 4,779,931 A * | 10/1988 | Miller | B60P 1/283 298/17 B |
| 10,829,026 B2 * | 11/2020 | Kibler | B60P 1/283 |
| 2003/0178883 A1 * | 9/2003 | Hinds | B60P 1/283 298/17 R |
| 2013/0043701 A1 | 2/2013 | Hagenbuch | |
| 2015/0217668 A1 | 8/2015 | Kita et al. | |
| 2018/0312097 A1 | 11/2018 | Petrie | |
| 2019/0193619 A1 | 6/2019 | Kibler | |

FOREIGN PATENT DOCUMENTS

JP   2014073755   4/2014

* cited by examiner

*Primary Examiner* — Stephen T Gordon

(57) ABSTRACT

A rocker support insert for a support rocker comprises a support plate configured to be removably coupled to a top portion of a rocker body; and a support padding fixedly coupled to a top surface of the support plate such that a portion of the top surface of the support plate remains exposed. A top surface of the support padding can define a concave upward-facing contact surface, and the support padding can be thicker than the support plate.

14 Claims, 9 Drawing Sheets

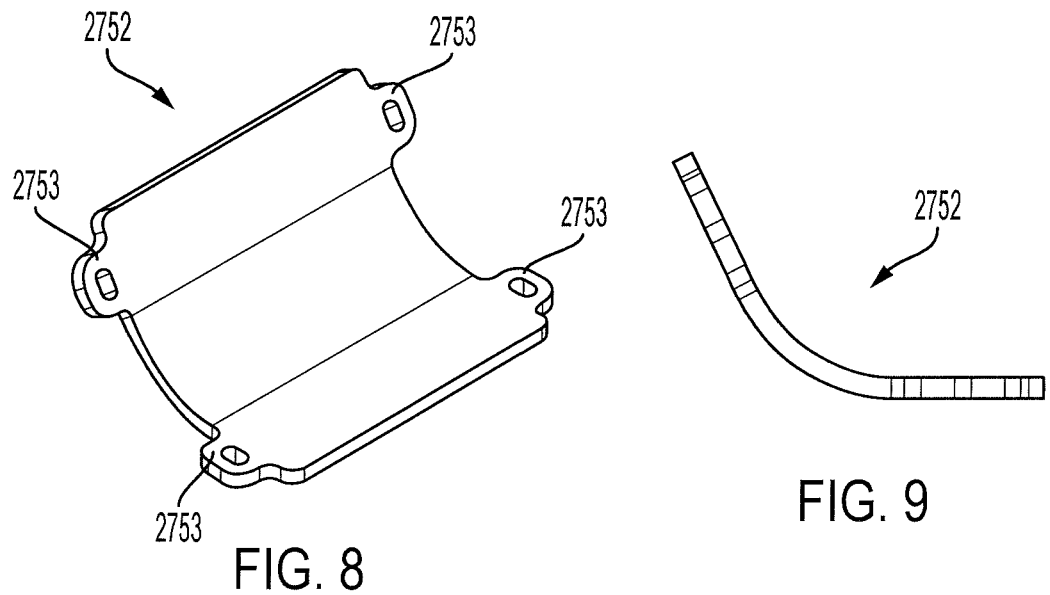
FIG. 8
FIG. 9
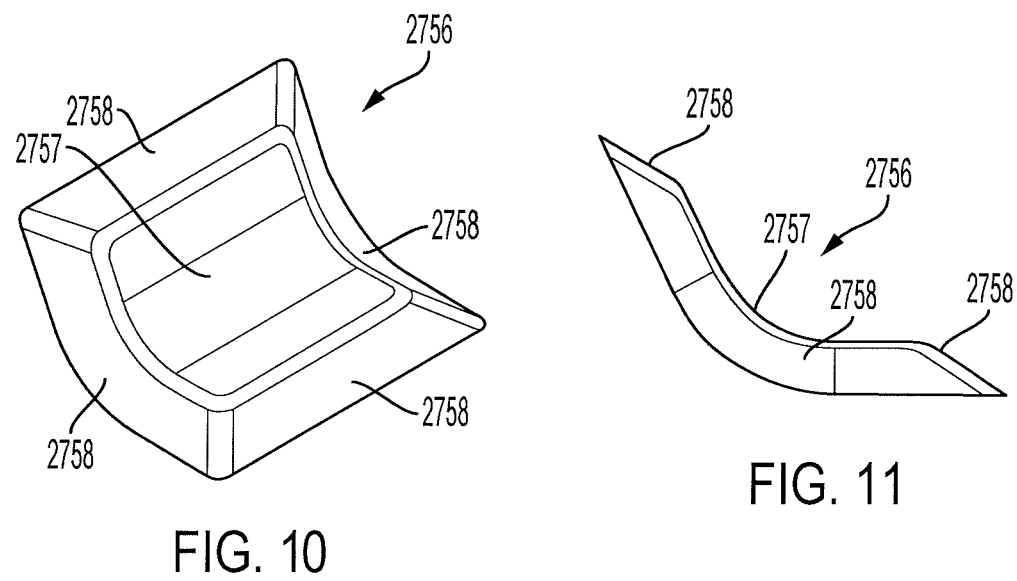
FIG. 10
FIG. 11

ROCKER SUPPORT INSERT

TECHNICAL FIELD

The present disclosure relates to haul trucks, and more particularly to rocker support inserts of rocker support assemblies for haul trucks, and systems, components, and methods thereof.

BACKGROUND

Conventionally, rear haul trucks have a dump body pivotally connected to a haul truck frame adjacent to a rear end of the dump body. A problem can arise with regard to connection between the dump body and the haul truck frame. The connection between the dump body and the haul truck frame can provide for load support points. These load support points can be sensitive to constraints such as manufacturing variations, poor maintenance practices, and/or unreliable support definition. This can lead to added reinforcement of multiple load paths.

Additionally, conventional space frames for haul trucks may be configured with static applications in mind. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain.

U.S. Pat. No. 4,789,118 ("the '118 patent") describes a pad apparatus for supporting a payload in a cradle apparatus of a space vehicle. The '118 patent describes that a plurality of pad assemblies are mounted at intervals along the inside surface of the cradle and can be adjusted in the radial direction by means of a screw adjustment. The '118 patent also describes that each pad assembly comprises a pad covering, a rocker pad, and an alignment and adjustment apparatus. According to the '118 patent, the pad covering is comprised of a plurality of elastomeric pads interleaved with metal sheets, is bonded to the rocker pad, and makes a bearing connection with the payload. The '118 patent further describes that the outer surface of the pad covering is shaped to accommodate a cylindrical payload.

SUMMARY OF THE DISCLOSURE

In one aspect, a rocker support insert for a support rocker is disclosed. The support rocker insert can comprise a support plate configured to be removably coupled to a top portion of a rocker body; and a support padding fixedly coupled to a top surface of the support plate such that a portion of the top surface of the support plate remains exposed, a top surface of the support padding defining a concave upward-facing contact surface. The support padding can be thicker than the support plate.

In another aspect, a rocker support insert for a support rocker is disclosed. The support rocker can be configured to be pivotally coupled to a rocker attachment interface of a space frame of an off-highway rear haul truck. The rocker support insert can comprise an arcuate support plate configured to be removably coupled to a top portion of a rocker body of the support rocker, each of a top surface and a bottom surface of the arcuate support plate being smooth; and an arcuate support padding fixedly coupled to the top surface of the arcuate support plate such that a portion of the top surface of the arcuate support plate remains exposed. A top surface of the arcuate support padding can define a concave upward-facing contact surface configured to have seated thereon a convex down-facing contact surface of a vertical support structure provided on a front wall of a dump body of the off-highway rear haul truck. A maximum thickness of the arcuate support padding can be greater than a maximum thickness of the arcuate support plate.

And in yet another aspect, a method regarding a rocker support insert is disclosed. The method can comprise providing a support plate of the rocker support insert; and providing a curved support padding of the rocker support insert fixedly coupled to a top surface of the support plate such that a portion of the top surface of the support plate remains exposed. A top surface of the curved support padding can define a concave upward-facing contact surface. The curved support padding can be thicker than the support plate.

Other features and aspects of this disclosure will be apparent from the following description and the accompanying drawings.

BRIEF DESCRIPTION OF THE DRAWINGS

FIG. 8 is a top, side perspective view of a support plate for the rocker support insert of FIG. 6, according to embodiments of the disclosed subject matter.

FIG. 9 is a side elevational view of the support plate of FIG. 8.

FIG. 10 is a top, side perspective view of support padding for the support plate of FIG. 8.

FIG. 11 is a side elevational view of the support padding of FIG. 10.

DETAILED DESCRIPTION

Figure 1:
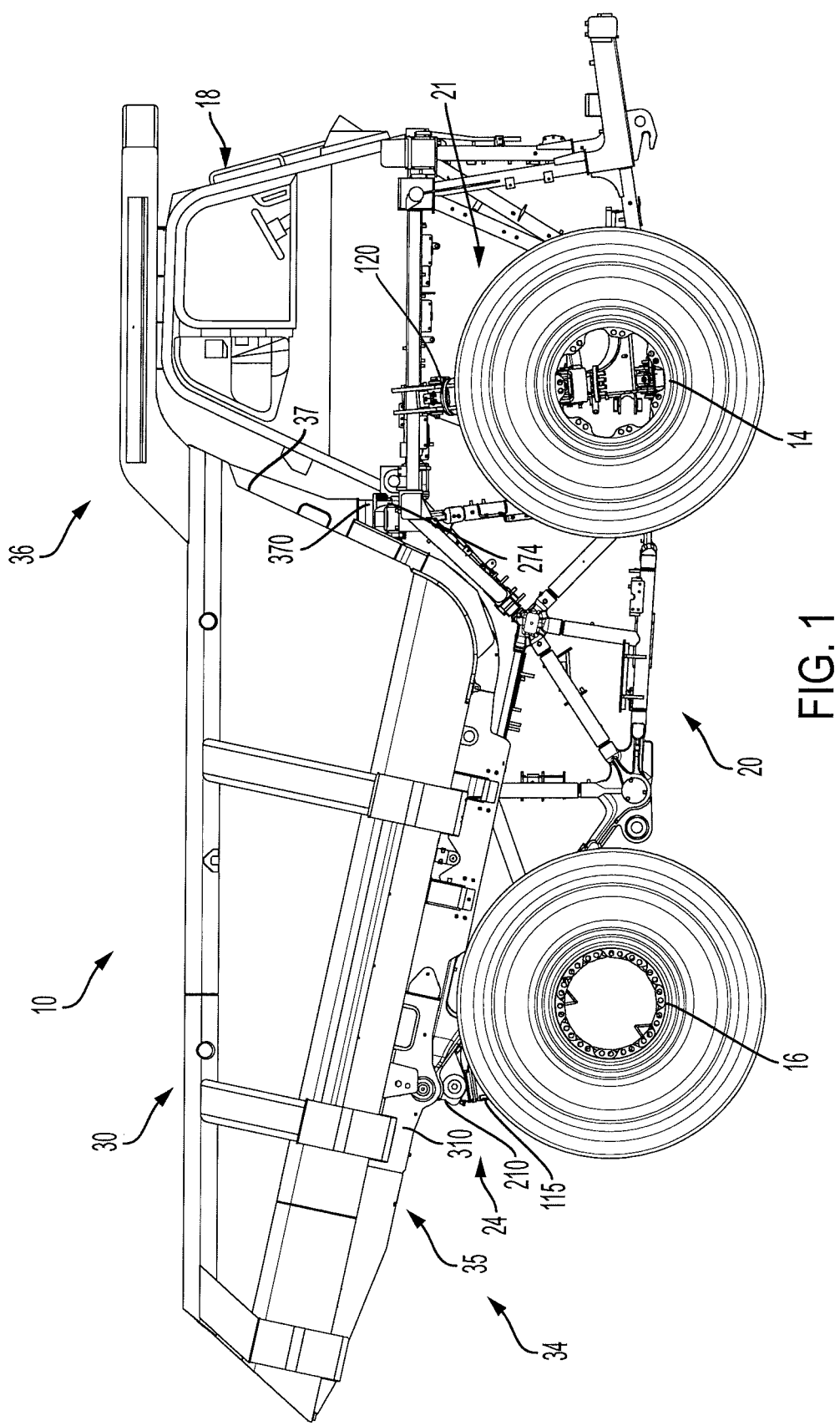
FIG. 1 is a side view of a machine according to embodiments of the disclosed subject matter.

Referring now to the drawings and with specific reference to FIG. 1, this illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 14:
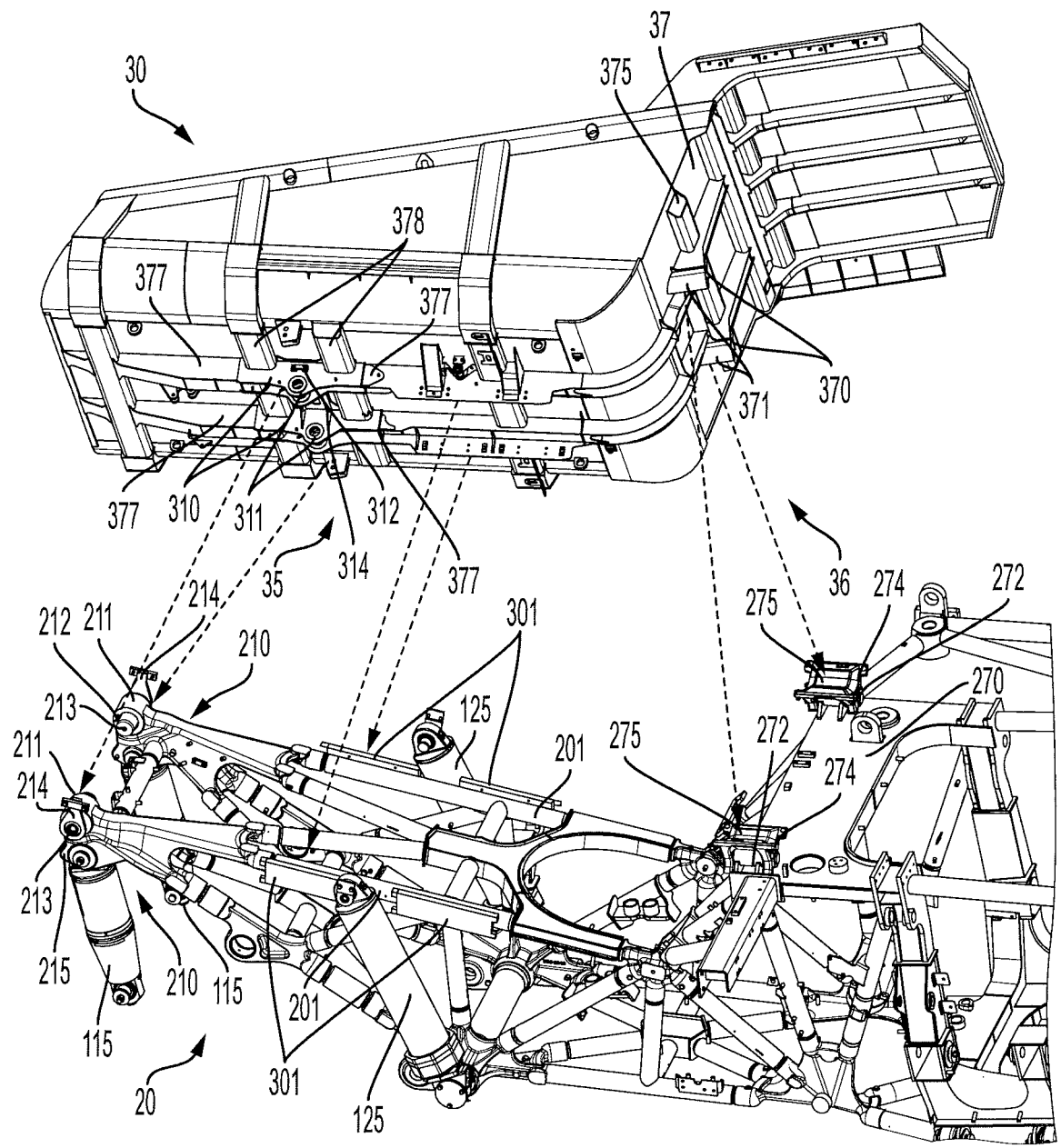
FIG. 14 is an exploded view of the space frame and dump body to show defined contact points according to embodiments of the disclosed subject matter.

As shown in FIG. 14, the space frame 20 can include a pair of rear frame connections 210 at the rear 24 of the space frame 20 and a front upper frame connection 270. Though the rear frame connections 210 are described as pairs, such connections of the pair may not be identical. For instance, the connections of may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The space frame 20 can also include a plurality of elongate support members, such as elongate support members 201 (see FIG. 14). Elongate support members, according to embodiments of the disclosed subject matter, can be in the form of rods and/or tubes, circular, for instance, where some or all of the rods and/or tubes may be solid or hollow.

Each elongate support member 201 can be provided between the rear frame connections 210 and the front upper frame connection 270 in a top plan view of the space frame 20. Further, each elongate support member 201 can extend lengthwise generally horizontally. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 of the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

Figure 2:
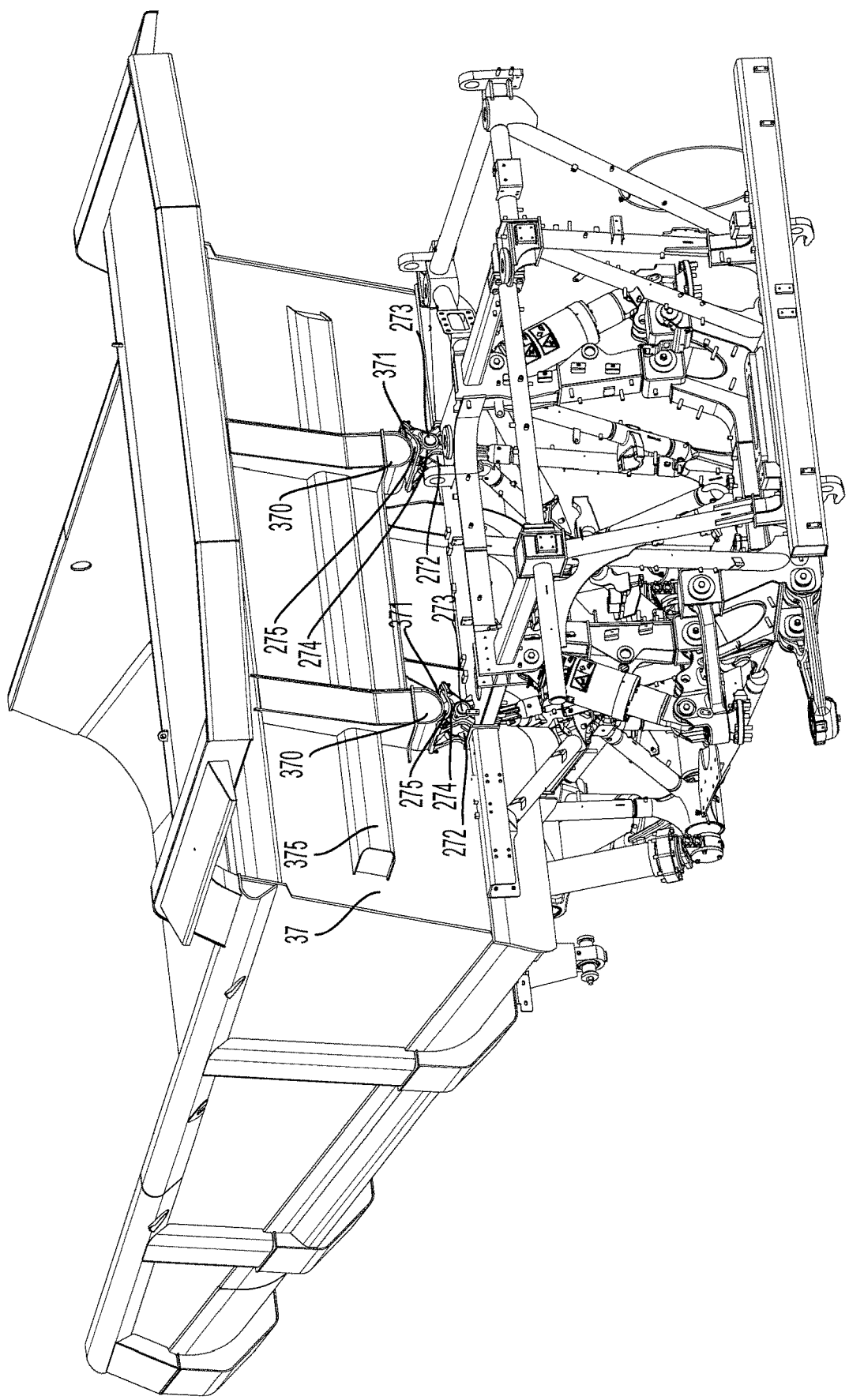
FIG. 2 is a front perspective view of the machine of FIG. 1 with an operator cabin thereof removed to show a space frame and a dump body thereof according to embodiments of the disclosed subject matter.
Figure 3:
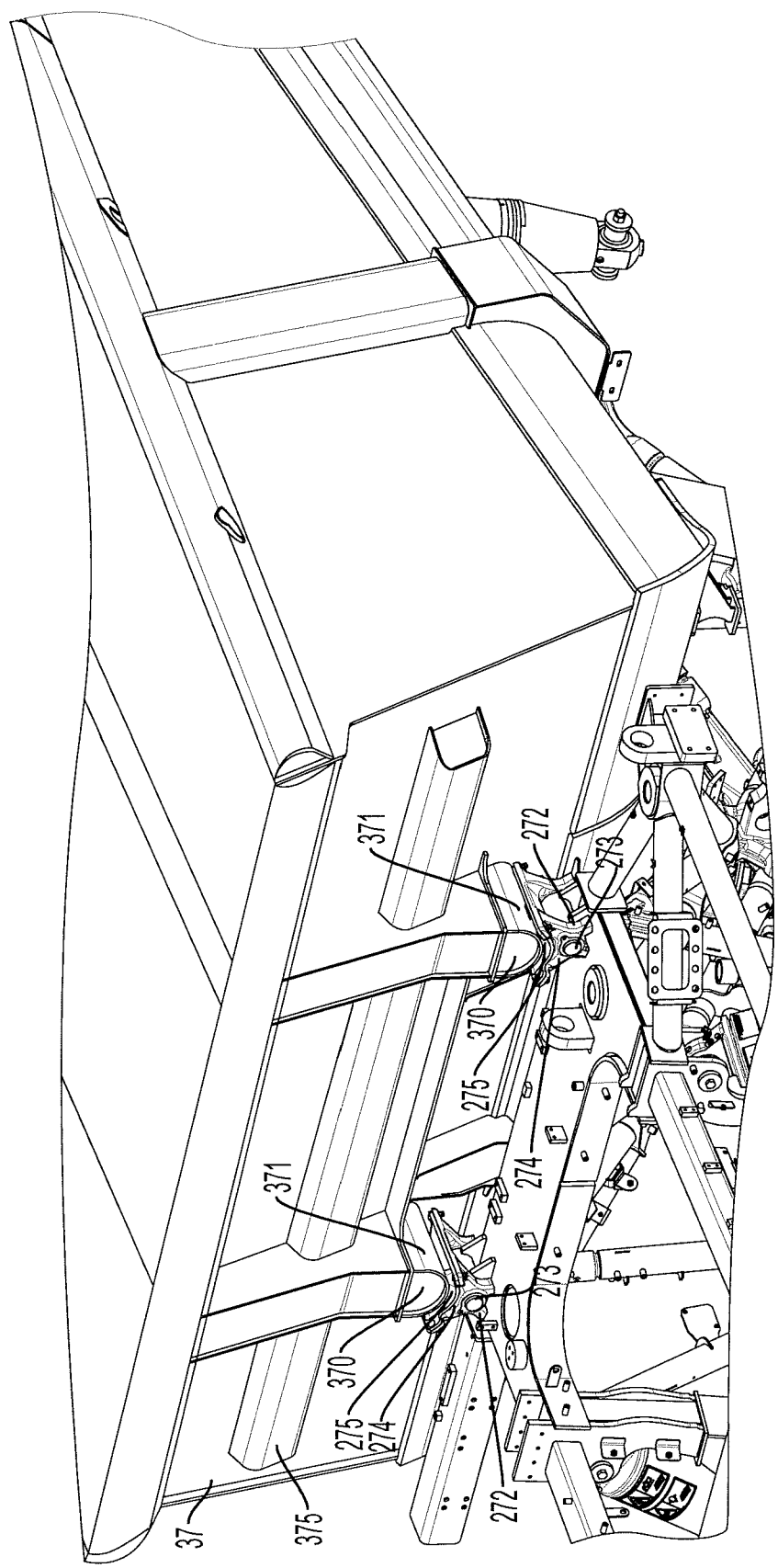
FIG. 3 is a partial front perspective view of the machine of FIG. 1 with the operator cabin thereof removed.

Turning to FIG. 2 and FIG. 3, the front upper frame connection 270 can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin 273. For example, two aligned pivot pin bores may be provided in spaced apart brackets extending from the top surface of the front upper frame connection 270. Optionally, the pivot pin 273 can be considered part of the rocker attachment interface 272.

An axis of rotation for the pivot pin bore of the rocker attachment interface 272 and the pivot pin 273 can run horizontally or substantially horizontally in a length direction of the space frame 20. Moreover, the axes of rotation defined by the rocker attachment interfaces 272 can be parallel to each other. Additionally, discussed in more detail below, the axes of rotation can be offset laterally outward of a vertical centerline running through respective vertical support structures 370.

Each rocker attachment interface 272 can have rotatably attached thereto a support rocker 274 via the pivot pin 273. Alternative to above, in one or more embodiments the pivot pin 273 can be considered part of the support rocker 274, rather than the rocker attachment interface 272. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272 and the pivot pins 273.

Figure 4:
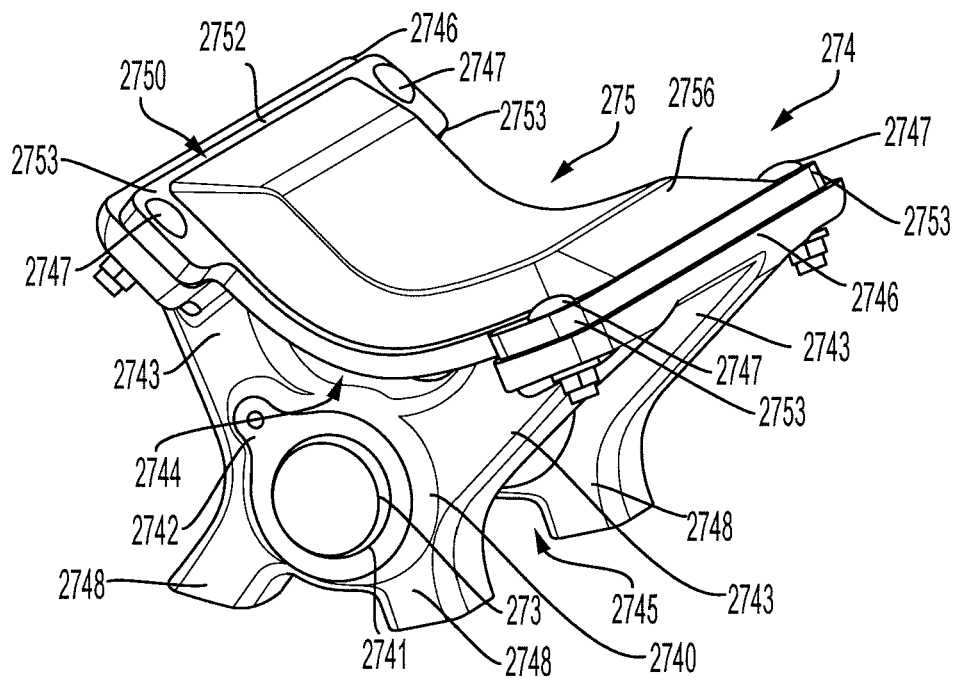
FIG. 4 is a top, side perspective view of a rocker support assembly according to embodiments of the disclosed subject matter.
Figure 5:
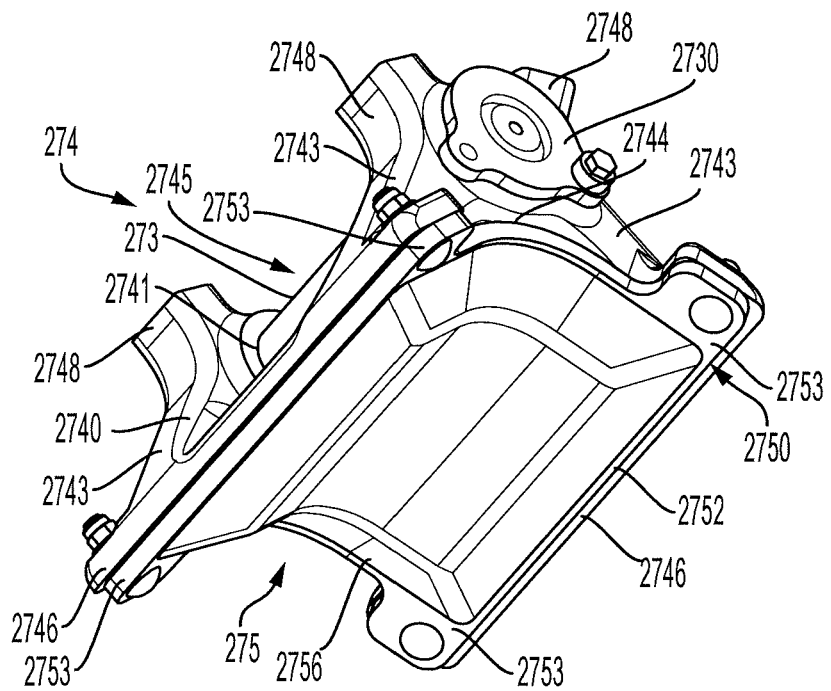
FIG. 5 is a bottom, side perspective view of the rocker support assembly of FIG. 4.

Turning to FIG. 4 and FIG. 5, each support rocker 274 can have an upward-facing contact surface 275. Discussed in more detail below, the support rockers 274, particularly the upward-facing contact surfaces 275 thereof, can receive a portion of corresponding vertical support structures 370 of the dump body 30.

The support rocker 274 can have a rocker body 2740, which can define a pivot pin bore 2741, and a rocker support insert 2750. The pivot pin bore 2741 can receive the pivot pin 273 to pivotally couple the rocker body 2740 to a corresponding one of the rocker attachment interfaces 272. Optionally, an orientation key 2742 can be provided in the rocker body 2740 to orient the pivot pin 273 relative to the rocker body 2740. An end cap 2730 (e.g., end plate) may also be provided at one or both ends of the pivot pin 273. The end cap 2730, which may be considered part of the pivot pin 273, can be provided to secure the pivot pin 273 in the pivot pin bore 2741. Optionally, the end cap 2730 may be removably coupled to the orientation key 2742 via one or more fasteners.

The rocker body 2740 can include an upper portion that removably receives the rocker support insert 2750. The upper portion may be U-shaped in a side view of the support rocker 274. According to one or more embodiments, the upper portion can include one or more arms 2743. FIG. 4 and FIG. 5, for instance, show four arms 2743, or two pairs of arms 2743 at opposite ends of the rocker body 2740. A space 2744 may be provided between each pair of arms 2743. Such space 2744 may also be between the arms 2743 and the rocker support insert 2750. Thus, each pair of arms 2743 can form the U-shape in the side view of the support rocker 274. A space 2745 may also exist between the pairs of arms 2743 at the opposite sides of the rocker body 2740.

Coupling extensions 2746 may be provided at ends of the arms 2743, and may extend across arms 2743 on opposite ends of the rocker body 2740. According to one or more embodiments of the disclosed subject matter, the coupling extensions 2746 can extend, in a length or end-to-end direction of the rocker body 2740, past corresponding arms 2743. That is, opposite ends of each coupling extension 2746 can extend past or project outwardly from arms 2743 on opposite ends of the rocker body 2740, such as shown in FIG. 4 and FIG. 5.

The coupling extensions 2746 can form coupling interfaces to removably couple the rocker support insert 2750 to the rocker body 2740. According to one or more embodiments, the coupling extensions 2746 can be configured to accommodate one or more fasteners 2747 to removably couple the rocker support insert 2750 to the rocker body 2740. For example, the coupling extensions 2746 can have one or more holes or openings to receive respective bolts, where respective nuts fasten to the bolts to secure the rocker support insert 2750 to the rocker body 2740, such as shown in FIG. 4 and FIG. 5. Incidentally, the rocker body 2740, which may be a casting, can have formed in one piece or integral therewith the arms 2743 and the coupling extensions 2746.

The rocker body 2740 may have a built-in rotation limit mechanism or range of motion stop configured to limit clockwise and/or counterclockwise rotation of the rocker body 2740. For example, according to one or more embodiments a stop may be built in to one or more inner surfaces of the rocker body 2740 adjacent to or at the pivot pin bore 2741. Alternatively, the rotation limit mechanism or range of motion stop may be in the form of one or more legs 2748 of the rocker body 2740. FIG. 4 and FIG. 5, for instance, show four legs 2748, or two pairs of legs 2748 on opposite ends of the rocker body 2740. Generally, the legs 2748 can extend outward and downward below the pivot pin bore 2741 and the pivot pin 273. Incidentally, the rocker body 2740 can have formed in one piece or integral therewith the one or more legs 2748.

The legs 2748 can rotate with the rocker body 2740 to limit a range of rotation for the support rocker 274 to a predetermined range. For example, rotation of the rocker body 2740 in a particular direction can cause one set of legs 2748 at one lengthwise-side of the rocker body 2740 to contact an upper surface of the space frame 20, for instance, an upper surface of the front upper frame connection 270. Such contact can prevent the support rocker 274 from further rotation in the same direction, thus defining one extremity of the range of rotation for the support rocker 274. Likewise, contact of the legs 2748 at the opposite lengthwise-side of the rocker body 2740 with the upper surface of the front upper frame connection 270 can define the other extremity of the range of rotation for the support rocker 274.

The range of rotation for the support rocker 274 can be set based on the configuration of the legs 2748. For instance, if all of the legs 2748 are of the same configuration (i.e., length), then the range of motion can be symmetrical for clockwise and counterclockwise rotation about a baseline center position. However, if the legs 2748 at one length-wise side of the rocker body 2740 are longer than the legs 2748 at the other side of the rocker body 2740, then the support rocker 274 may be more limited in rotation toward the side with the longer legs 2748.

The rocker support insert 2750, which can include a support plate 2752 and support padding 2756 provided on the support plate 2752, can generally conform to the shape of the upper portion of the rocker body 2740, at least in terms of an outer profile. For example, the support plate 2752 can have plate coupling extensions 2753 provided in general correspondence with the coupling extensions 2746. In addition to supporting a portion of the support padding 2756 on a top side thereof, the plate coupling extensions 2753 can form coupling interfaces to removably couple the rocker support insert 2750 to the rocker body 2740. According to one or more embodiments, the plate coupling extensions 2753 can be configured to accommodate one or more fasteners 2747 to removably couple the rocker support insert 2750 to the rocker body 2740. For example, the plate coupling extensions 2753 can have one or more holes or openings (e.g., elongate slots) to receive respective bolts, where respective nuts fasten to the bolts to secure the rocker support insert 2750 to the rocker body 2740, such as shown in FIG. 4 and FIG. 5.

The rocker support insert 2750 can define an upward-facing contact surface 275. According to one or more embodiments, the upward-facing contact surface 275 can be concave. For instance, the upward-facing contact surface 275 can be semi-cylindrical, such as shown in FIG. 4 and FIG. 5. Alternatively, the upward-facing contact surface 275 can be elliptical or multi-planar. The upward-facing contact surface 275 can be configured to have seated thereon a down-facing contact surface, such as down-facing contact surface 371 of vertical support structure 370 (see FIG. 2 and FIG. 3). According to one or more embodiments, the geometries of the down-facing contact surface 275 and the upward-facing contact surface 371 can match or substantially match (e.g., both semi-cylindrical) in an uncompressed and/or compressed state of the support padding 2756.

Figure 6:
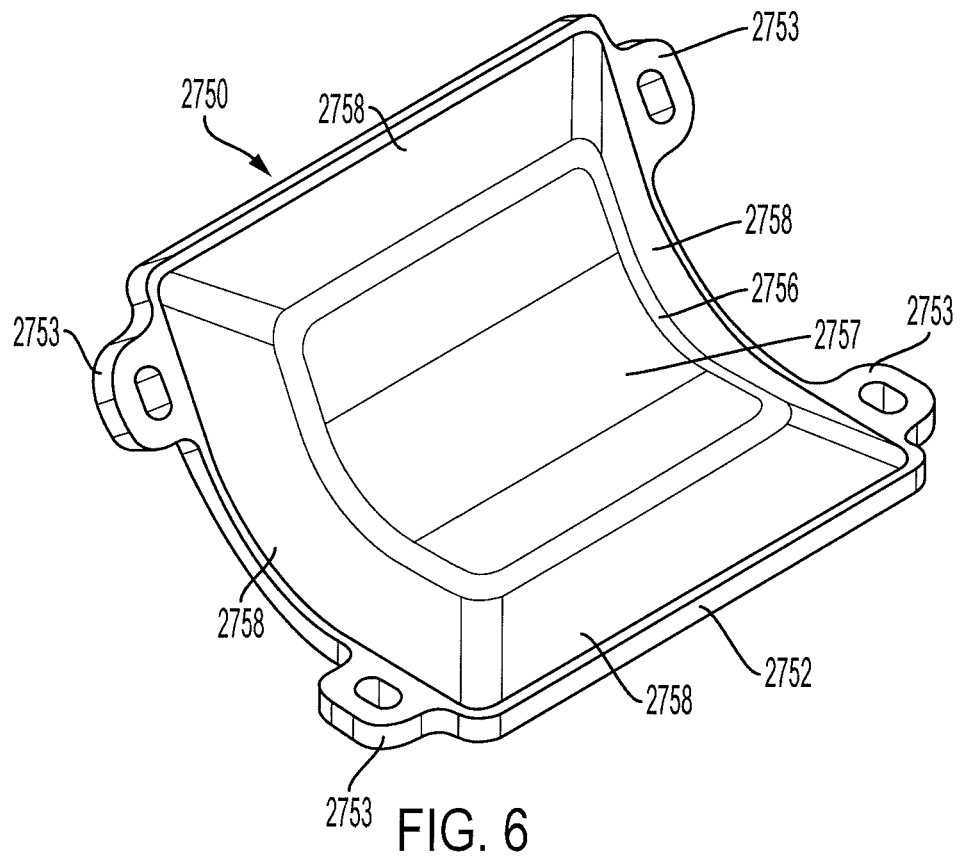
FIG. 6 is a top, side perspective view of a rocker support insert for the rocker support assembly of FIG. 4, according to embodiments of the disclosed subject matter.
Figure 7:
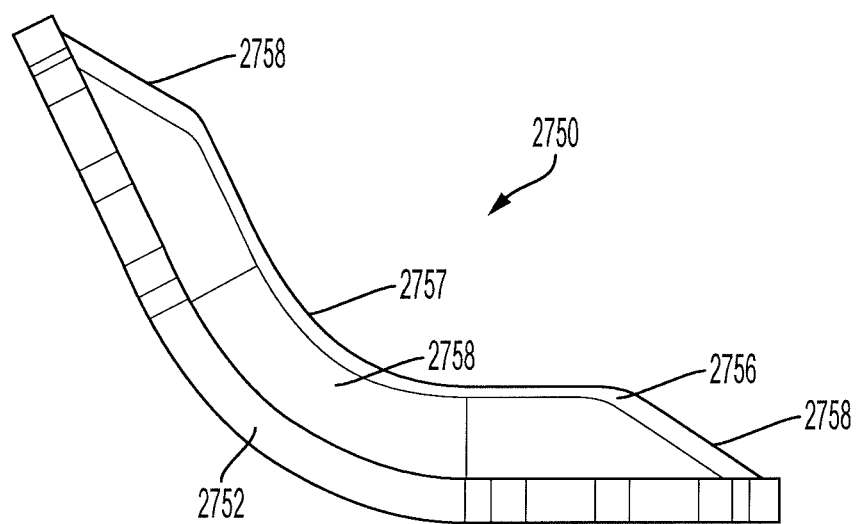
FIG. 7 is a side elevational view of the rocker support insert of FIG. 6.

Turning to FIG. 6 and FIG. 7, the rocker support insert 2750 can be curved, as shown, for instance, where a top surface of the support plate 2752 can have provided thereon the support padding 2756 in general correspondence in curvature. The support padding 2756, which may be in the form of a single pad, can be fixedly coupled to the top surface of the support plate 2752. For instance, the support padding 2756 can be bonded to the top surface of the support late 2752 using an adhesive. A space between the support padding 2756 and the edge of the support plate 2752 may exist to create a ledge that extends around some or all of the perimeter of the support padding 2756. Such spacing, which is discussed in more detail below, can allow portions of the support padding 2756 to bulge in response to loading thereon such that the edge portions of the support padding 2756 do not extend past edges of the support plate 2752. Additionally, as particularly shown in FIG. 7, the support padding 2756 can have a thickness greater than a thickness of the support plate 2752. For instance, the thickness of the support padding 2756 can be twice or more the thickness of the support plate 2752. Optionally, the thickness of the support plate 2752 may be uniform.

Turning now to FIG. 8 and FIG. 9, the support plate 2752 can be flat (i.e., smooth) on top and bottom surfaces. Additionally, according to one or more embodiments of the disclosed subject matter, the support plate 2752 may have a length greater than a width, where length may be defined in the direction of the pivot pin bore 2741. Of course, embodiments of the disclosed subject matter are not limited to support plates having lengths greater than widths. The support plate 2752 can be made of a metal or metallic material, such as steel.

Referring to FIG. 6, FIG. 10, and FIG. 11, the support padding 2756 can have a center support portion 2757 and peripheral portions 2758. The center support portion 2757 may form some or all of the upward-facing contact surface 275. Optionally, the peripheral portions 2758 can taper from thick to thin outward from the center support portion 2757 toward the edges of the support plate 2752. Such tapering can allow portions of the support padding 2756 to bulge in response to loading thereon such that the bulging portions do not extend past edges of the support plate 2752. The support padding 2756 can be made or comprised of an elastomer configured to exhibit suitable fatigue and load versus deflection characteristics. According to one or more embodiments, the elastomer can be short A natural rubber having a hardness based on $L=A*d^4-B*d^3+C*d^2-D*d+E$, where A, B, C, D & E are constants, L is load, and d is displacement. As but one example, the support padding 2756 can be made from 75 shore A natural rubber.

Figure 12:
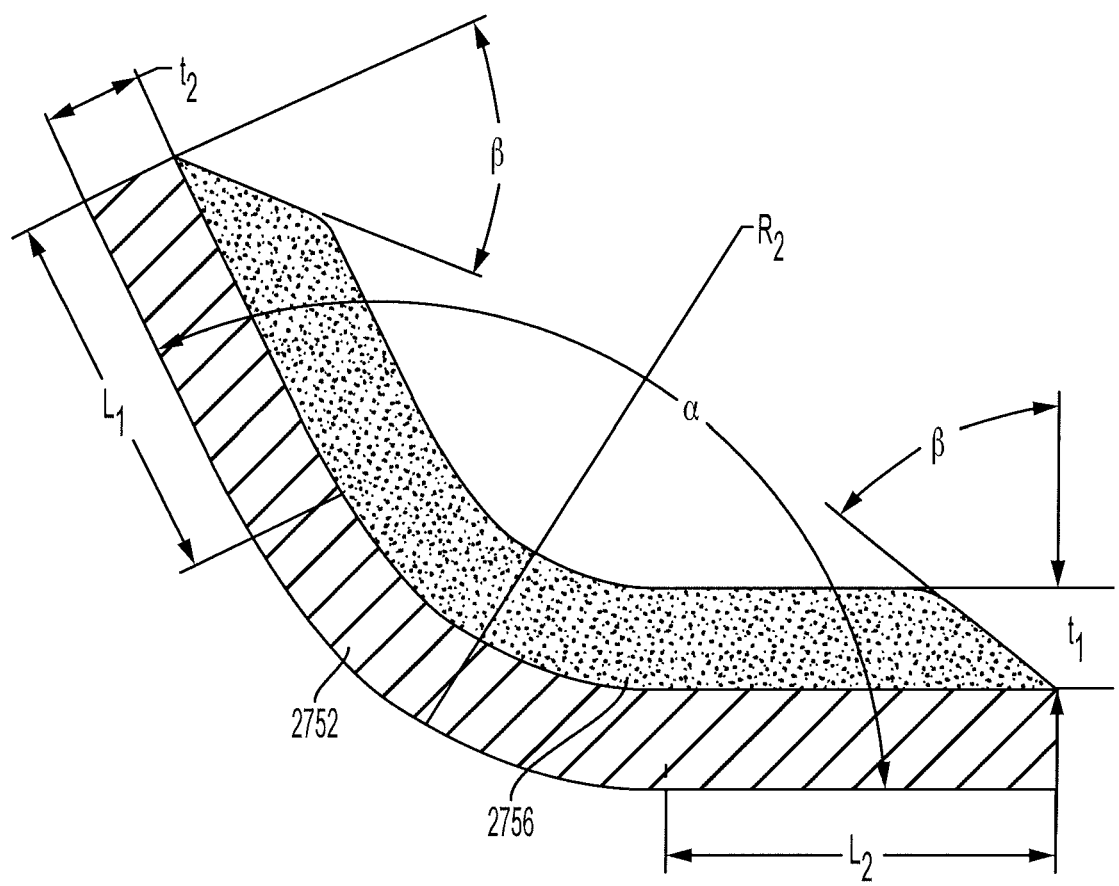
FIG. 12 is a sectional view of a rocker support insert according to embodiments of the disclosed subject matter.

FIG. 12 is a sectional view of rocker support insert 2750 according to embodiments of the disclosed subject matter. The described dimensions are non-limiting examples. Moreover, some or all of the characteristics may hold true for embodiments of the disclosed subject matter.

Referring to FIG. 12, the support padding 2756 may be symmetrical in the sectional view such that $L_1$ equals $L_2$. Alternatively, $L_1$ may be greater than $L_2$ or vice versa, depending upon the space claim, load requirement, and/or serviceability. The foregoing dimensions may also be applicable to the support plate 2752. The angle $\alpha$ can be 90° or greater, for instance, from 90° to 135°. Such angle can be based on a diameter or arc of curvature of the dump body 30 support structure to be provided thereon, particularly the difference in contact area between the support padding 2756 and the down-facing contact surface 371 of the dump body 30 support structure provided thereon. The foregoing dimension may also be applicable to the support plate 2752. A radius of curvature of the support padding 2756 may be interdependent on the angle $\alpha$. That is, a change in angle can drive a change in radius and vice versa. The foregoing dimensions may also be applicable to the support plate 2752.

The thickness $t_1$ of the support padding 2756 can depend upon the stiffness requirement, i.e., load per unit length, and/or the shore hardness of the particular type of material (e.g., elastomer) for the support padding 2756. The relationship between the load and deflection/displacement can be governed by $L=A*d^4-B*d^3+C*d^2-D*d+E$, where A, B, C, D & E are constants, L is load, and d is displacement. As a non-limiting example, according to one or more embodiments, the thickness $t_1$ can be from 1 to 2 inches. The thickness $t_2$ of the support plate 2752 can be dependent upon the stiffness requirement, i.e., load per unit length. For instance, the thickness $t_2$ may be from 5 mm to 25 mm.

Angle $\beta$ can define the slope (i.e., taper) of the peripheral portions 2758 of the support padding 2756. As a non-limiting example, angle $\beta$ can be from 30° to 75°, depending upon the diameter or arc of curvature of the dump body 30 support structure to be provided thereon (e.g., down-facing contact surface 371 of vertical support structure 370), particularly the difference in contact area between the support padding 2756 and the dump body 30 support structure.

Notably, portions of the support padding 2756 may be caused to bulge as the support padding 2756 is compressed. The angle β can be set to prevent folding of the sides of the support padding 2756 when bulging due to compression.

It is worth noting here that support rockers 274 according to embodiments of the disclosed subject matter can support a variety of dump body 30 support structures having different diameters or arcs of curvature. For example, embodiments of the disclosed subject matter can support dump body 30 support structures (e.g., down-facing contact surface 371 of vertical support structure 370) having perimeter portions that are at or inside of the peripheral portions 2758 of the support padding 2756, at least for an uncompressed state of the support padding 2756.

Figure 13C:
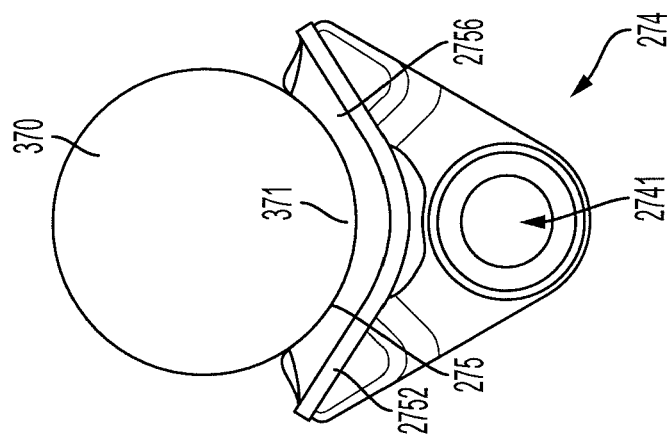
FIGS. 13A-13C show exemplary operational states of a rocker support assembly according to embodiments of the disclosed subject matter.
Figure 13B:
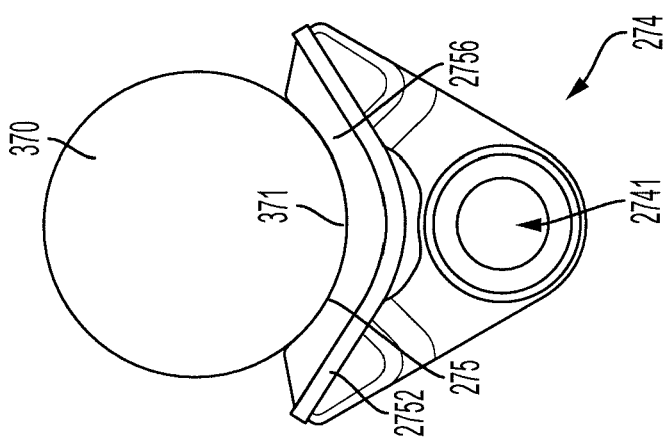
Figure 13A:
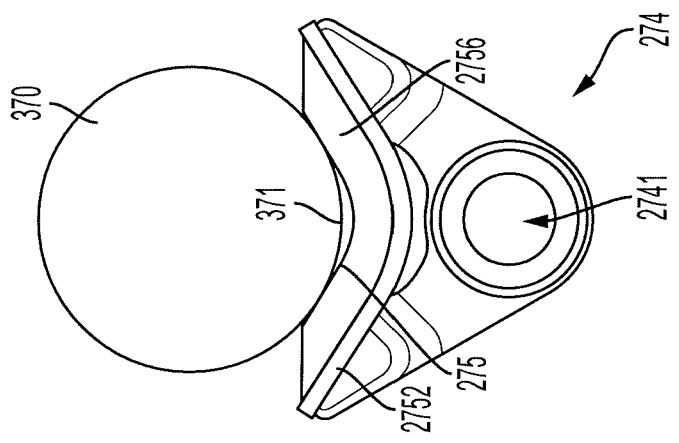

FIGS. 13A-13C show exemplary operational states of support rockers 274 according to embodiments of the disclosed subject matter. FIG. 13A shows an example in an uncompressed state, i.e., the load, in this case the vertical support structure 370, merely rests on the support padding 2756 forming the upward-facing contact surface 275 of the support rocker 274. FIG. 13B shows a compressed state, whereby the vertical support structure 370 exhibits a greater load on the support rocker 274. Notably, in the compressed state more contact area exists between the support padding 2756 and the down-facing contact surface 371 of the vertical support structure 370. FIG. 13C shows a highly compressed state, whereby the vertical support structure 370 exhibits an even greater load on the support rocker 274. Notably, edge portions of the support padding 2756 can be caused to bulge. However, due to the spacing between the edge of the support plate 2752 and the edges of the support padding 2756 and/or the angle β of the peripheral portions 2758, the bulging does not extend or protrude past the edges of the support plate 2752.

Turning now to FIG. 14, the dump body 30 can have, on the bottom 35 thereof, a rear pivot support 310 and a pair of flat contact surfaces 301, and on the front wall 37 thereof, a pair of the vertical support structures 370.

The rear pivot support 310 can be provided at the rear portion 34 of the dump body 30, such as shown in FIG. 1 and FIG. 14. The rear pivot support 310 can have a pair of rear pivots 311. The rear pivots 311 can be spaced apart from each other in a width or lateral direction of the dump body 30, such as shown in FIG. 14. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 14, for instance, each rear pivot 311 can be welded in-line with the corresponding longitudinal body support member 377. Thus, the rear pivot 311 can be considered as part of the longitudinal body support member 377 (i.e., integral and/or one-piece with). Additionally, Each rear pivot 311 can receive or accept a plurality of transverse body support members 378 via cut-outs.

According to one or more embodiments of the disclosed subject matter, the rear pivots 311 can also include an attachment interface 312 on an outer side surface thereof, such as shown in FIG. 14. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in a pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312 via a bracket or the like, for instance, fixed to the projections via bolts, rivets, or welding as non-limiting examples.

The bottom 35 of the dump body 30 can include the plurality of flat contact surfaces 301, such as shown in FIG. 14. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 14. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 14. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 14 may constitute the flat contact surface 301.

Discussed in more detail below, when the dump body 30 is in a lowered position (i.e., rest position), the flat contact surfaces 301 attached to the dump body 30 can be positioned as shown in FIG. 14. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 20 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to rocker support inserts of rocker support assemblies for haul trucks, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by lift cylinders 125.

Referring again to FIG. 14, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 14. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Indeed, all of the vertical loading can go through or be shared by the pivot pins 273 and the support rockers 274. To some extent support for horizontal components of force vectors with respect to the dump body 30 load being transferred through the space frame 20 and the front suspension system to the front wheels 14 can be controlled based on the incline or offset of the pivot axis of the support rocker 274 relative to the vertical centerline of the vertical support structure 370, though the second pair of contact points discussed above can take up a larger portion of the horizontal loading.

Additionally, because the support rockers 274 can pivot laterally and independently of each other, and because both the support rockers 274 and the vertical support structures 370 can have cooperating contact surfaces (i.e., upward-facing contact surfaces 275 and down-facing contact surfaces 371, respectively), proper seating between the vertical support structures 370 and the support rockers 274 can be maintained, along with uniform loading on each support padding 2756, particularly when the dump body 30 is in the at-rest position, even when the machine 10 is moving, for instance. Such arrangement can thus provide an even load distribution with respect to each side of the support arrangement (i.e., side to side or laterally). The pivoting of the support rockers 274 can also allow the support rocker 274 to take into account any tolerance stackup in the dump body 30 and space frame 20. Additionally, uniform bend radius of the support rocker 274 can ensure load transfer is directed back to center of the pivot pin 273 in an effort to reduce or eliminate bending moments. Furthermore, the edge chamfer (i.e., taper) of the peripheral portions 2758 of the support padding 2756 and radius of curvature of the upward-facing contact surface 275 formed by the support padding 2756 can deflect to a uniform contact pressure distribution at peak compressive loads.

In a front view the support rocker 274/vertical support structure 370 combinations can be located along longitudinal axes of respective front struts connected to respective front suspension members 120 on same sides of the space frame 20. For example, the pivot axis of the support rocker 274 may be aligned with a longitudinal axis a corresponding front strut. The longitudinal axes can intersect at a point at a vertical centerline at a top of the dump body 30. Of course, embodiments of the disclosed subject matter are not so limited, and the longitudinal axis of the front strut may not be aligned with the support rocker 271/vertical support structure 370 combination, such as the pivot axis of the support rocker 274. Also, longitudinal axes of additional suspension members on opposite sides of the space frame 20 can intersect at a point at the same vertical centerline of the machine 10 as the point at the vertical centerline at the top of the dump body 30. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A rocker support insert for a support rocker configured to be pivotally coupled to a rocker attachment interface of a space frame of an off-highway rear haul truck, the rocker support insert comprising:
    an arcuate support plate configured to be removably coupled to a top portion of a rocker body of the support rocker, each of a top surface and a bottom surface of the arcuate support plate being smooth; and
    an arcuate support padding fixedly coupled to the top surface of the arcuate support plate such that a portion of the top surface of the arcuate support plate remains exposed,
    wherein a top surface of the arcuate support padding defines a concave upward-facing contact surface configured to have seated thereon a convex down-facing contact surface of a vertical support structure provided on a front wall of a dump body of the off-highway rear haul truck,
    wherein the arcuate support padding includes a center support portion and a plurality of peripheral portions surrounding the center support portion, the center support portion forming the top surface of the arcuate support padding that defines the concave upward-facing contact surface,
    wherein each of the peripheral portions of the arcuate support padding is tapered from thick to thin from the center support portion toward a corresponding outer edge of the arcuate support plate, and
    wherein a maximum thickness of the arcuate support padding is greater than a maximum thickness of the arcuate support plate.

2. The rocker support insert of claim 1, wherein the arcuate support plate has a uniform thickness which corresponds to the maximum thickness of the arcuate support plate.

3. The rocker support insert of claim 1, wherein the arcuate support plate has a length greater than a width thereof, and the arcuate support padding has a length greater than a width thereof, the length and width of the arcuate support padding respectively being less than the length and width of the arcuate support plate.

4. The rocker support insert of claim 1, wherein the portion of the top surface of the arcuate support plate that remains exposed includes a ledge around an entire periphery of the arcuate support padding.

5. The rocker support insert of claim 1, wherein the portion of the top surface of the arcuate support plate that remains exposed includes opposing ends of plate coupling extensions configured to removably couple the arcuate support plate to the top portion of the rocker body.

6. The rocker support insert of claim 1, wherein the arcuate support padding consists of a single elastomer padding member.

7. The rocker support insert of claim 6, wherein the elastomer of the single elastomer padding member is short A natural rubber having a hardness based on $L=A*d^4-B*d^3+C*d^2-D*d+E$, where A, B, C, D & E are constants, L is load, and d is displacement.

8. The rocker support insert of claim 1, wherein the concave upward-facing contact surface is one of semi-cylindrical, elliptical or multi-planar.

9. A rocker support insert for a support rocker comprising:
    a support plate configured to be removably coupled to a top portion of a rocker body; and
    a support padding fixedly coupled to a top surface of the support plate such that a portion of the top surface of the support plate remains exposed, a top surface of the support padding defining a concave upward-facing contact surface,
    wherein the support padding includes a center support portion and a plurality of peripheral portions surrounding the center support portion, the center support portion forming the top surface of the support padding that defines the concave upward-facing contact surface,
    wherein each of the peripheral portions of the support padding is tapered from thick to thin from the center support portion toward a corresponding outer edge of the support plate, and
    wherein the support padding is thicker than the support plate.

10. The rocker support insert of claim 9, wherein a length and a width of the support padding respectively are less than a length and a width of the support plate.

11. The rocker support insert of claim 9, wherein the support plate and the support padding are curved so as to form an obtuse angle.

12. The rocker support insert of claim 9, wherein the portion of the top surface of the support plate that remains exposed includes a ledge around an entire periphery of the support padding.

13. The rocker support insert of claim 9, wherein the portion of the top surface of the support plate that remains exposed includes opposing ends of plate coupling extensions configured to removably couple the support plate to the top portion of the rocker body.

14. The rocker support insert of claim 9, wherein the support padding is comprised of an elastomer.

* * * * *